United States Patent
Nayar et al.

(10) Patent No.: US 10,671,947 B2
(45) Date of Patent: Jun. 2, 2020

(54) DISTRIBUTING TASKS TO WORKERS IN A CROWD-SOURCING WORKFORCE

(71) Applicant: NETFLIX, INC., Los Gatos, CA (US)

(72) Inventors: Venu Gopal Nayar, San Anselmo, CA (US); David Chen, San Francisco, CA (US); Aroon Ramadoss, San Francisco, CA (US); Ryan Schroeder, San Anselmo, CA (US); Vinod Vishwanathan, San Ramon, CA (US)

(73) Assignee: NETFLIX, INC., Los Gatos, CA (US)

( * ) Notice: Subject to any disclaimer, the term of this patent is extended or adjusted under 35 U.S.C. 154(b) by 463 days.

(21) Appl. No.: 14/200,330

(22) Filed: Mar. 7, 2014

(65) Prior Publication Data

US 2015/0254596 A1    Sep. 10, 2015

(51) Int. Cl.
| | |
|---|---|
| *G06Q 10/06* | (2012.01) |
| *H04N 19/167* | (2014.01) |
| *H04N 19/146* | (2014.01) |
| *H04N 19/46* | (2014.01) |
| *G06Q 50/00* | (2012.01) |
| *H04N 19/597* | (2014.01) |

(52) U.S. Cl.
CPC ............ *G06Q 10/063112* (2013.01); *G06Q 10/06395* (2013.01); *G06Q 50/01* (2013.01); *H04N 19/146* (2014.11); *H04N 19/167* (2014.11); *H04N 19/46* (2014.11); *H04N 19/597* (2014.11)

(58) Field of Classification Search
None
See application file for complete search history.

(56) References Cited

U.S. PATENT DOCUMENTS

| | | | | | |
|---|---|---|---|---|---|
| 5,987,149 | A * | 11/1999 | Poor | ...................... | G09B 7/066 382/100 |
| 6,687,677 | B1 * | 2/2004 | Barnard | ........... | G06Q 10/06311 705/7.13 |
| 6,757,005 | B1 * | 6/2004 | Elbaz | ..................... | H04N 7/152 348/14.09 |
| 6,859,523 | B1 * | 2/2005 | Jilk | ........................ | G06Q 10/06 379/265.01 |
| 8,332,248 | B2 * | 12/2012 | Hutchinson | ............ | G06Q 10/00 705/7.11 |
| 8,386,308 | B2 * | 2/2013 | Kansal | .................. | H04L 67/327 705/14.16 |

(Continued)

*Primary Examiner* — Patricia H Munson
*Assistant Examiner* — Crystol Stewart
(74) *Attorney, Agent, or Firm* — Artegis Law Group, LLP (57) ABSTRACT

One embodiment of the invention disclosed herein provides techniques for distributing tasks to skilled workers participating in a managed crowd-sourcing workforce. A crowd worker routing system receives a request for a task assignment from a first worker participating in the crowd-sourcing workforce. The crowd worker routing system retrieves one or more scores associated with the first worker, wherein each score is related to the performance of the first worker with respect to completing a prior set of task assignments. The crowd worker routing system determines that a first task assignment included in a first set of task assignments is related to a first score included in the one or more scores. The crowd worker routing system determines whether to route the first task assignment to the first worker for completion based on the first score and one or more routing rules.

21 Claims, 7 Drawing Sheets

(56) References Cited

U.S. PATENT DOCUMENTS

| | | | |
|---|---|---|---|
| 8,990,188 B2* | 3/2015 | Yen | G06Q 50/184 707/717 |
| 2002/0120493 A1* | 8/2002 | Mormile | G06Q 10/087 700/100 |
| 2004/0204941 A1* | 10/2004 | Israch | G10L 15/30 704/240 |
| 2004/0205217 A1* | 10/2004 | Gabrani | H04N 21/40 709/231 |
| 2005/0091098 A1* | 4/2005 | Brodersen | G06Q 10/06 705/500 |
| 2005/0125274 A1* | 6/2005 | Nastacio | G06Q 10/063112 705/26.1 |
| 2007/0033419 A1* | 2/2007 | Kocher | G06F 21/10 713/193 |
| 2007/0250901 A1* | 10/2007 | McIntire | H04N 7/17318 725/146 |
| 2007/0299828 A1* | 12/2007 | Lewis | G06Q 10/06 |
| 2008/0066072 A1* | 3/2008 | Yurekli | G06Q 10/06 718/104 |
| 2009/0112676 A1* | 4/2009 | Reich | G06Q 10/0637 705/7.36 |
| 2009/0204906 A1* | 8/2009 | Irving | H04N 7/15 715/753 |
| 2009/0210282 A1* | 8/2009 | Elenbaas | G06Q 10/06 705/7.13 |
| 2011/0066556 A1* | 3/2011 | Kadosh | G06Q 10/06 705/80 |
| 2011/0225290 A1* | 9/2011 | Kansal | H04L 67/1097 709/224 |
| 2011/0251896 A1* | 10/2011 | Impollonia | G06Q 30/02 705/14.55 |
| 2011/0307304 A1* | 12/2011 | Mercuri | G06Q 10/101 705/12 |
| 2012/0029963 A1* | 2/2012 | Olding | G06Q 10/06 705/7.14 |
| 2012/0046989 A1* | 2/2012 | Baikalov | G06Q 10/0635 705/7.28 |
| 2012/0054112 A1* | 3/2012 | Gormish | G06Q 10/06 705/301 |
| 2012/0072268 A1* | 3/2012 | Ritter | G06Q 10/06 705/7.39 |
| 2012/0265573 A1* | 10/2012 | Van Pelt | G06Q 10/063114 705/7.14 |
| 2012/0277887 A1* | 11/2012 | Reese | G06Q 10/0639 700/32 |
| 2012/0284090 A1* | 11/2012 | Marins | G06Q 10/0631 705/7.39 |
| 2013/0110590 A1* | 5/2013 | Folk | G06Q 10/06 705/7.42 |
| 2013/0124242 A1* | 5/2013 | Burke | G06Q 10/101 705/7.12 |
| 2013/0257851 A1* | 10/2013 | Lee | H04N 13/261 345/419 |
| 2013/0317871 A1* | 11/2013 | Kulkarni | G06Q 10/06 705/7.14 |
| 2014/0019986 A1* | 1/2014 | Reis | G06F 9/4881 718/102 |
| 2014/0033042 A1* | 1/2014 | Khatib | G11B 27/034 715/723 |
| 2014/0108103 A1* | 4/2014 | Romaine | G06Q 10/06395 705/7.41 |
| 2014/0122188 A1* | 5/2014 | Van Pelt | G06Q 10/06398 705/7.42 |
| 2014/0358605 A1* | 12/2014 | Balamurugan | G06Q 10/06311 705/7.13 |
| 2015/0074033 A1* | 3/2015 | Shah | G06N 5/02 706/46 |
| 2015/0154529 A1* | 6/2015 | Raajaratnam | G06Q 10/1097 705/7.15 |
| 2015/0220871 A1* | 8/2015 | Rajan | G06Q 10/063112 705/7.14 |
| 2015/0356488 A1* | 12/2015 | Eden | G06Q 50/01 705/7.41 |

* cited by examiner

| SCORING DATABASE 255 ||||||
|---|---|---|---|---|---|
| ID 320 | TYPE 325 | SUBTYPE 330 | LANGUAGE 335 | COMPLETED 340 | SCORE 345 |
| 1 | AUDIO | null | ENGLISH | 40 | 75 |
| | AUDIO | null | SPANISH | 26 | 80 |
| | AUDIO | null | FRENCH | 14 | 72 |
| | TEXT | CC | ENGLISH | 17 | 71 |
| | TEXT | SUB | FRENCH | 11 | 70 |
| | VIDEO | null | null | 17 | 62 |
| 2 | VIDEO | null | null | 40 | 80 |
| | AUDIO | null | SPANISH | 26 | 75 |
| | AUDIO | null | FRENCH | 14 | 72 |
| | TEXT | CC | ENGLISH | 17 | 71 |
| | TEXT | SUB | FRENCH | 11 | 70 |
| | AUDIO | null | ENGLISH | 17 | 62 |
| 3 | VIDEO | null | null | 40 | 75 |
| | AUDIO | null | SPANISH | 26 | 20 |
| | AUDIO | null | FRENCH | 14 | 22 |
| | TEXT | CC | ENGLISH | 17 | 21 |
| | TEXT | SUB | FRENCH | 11 | 20 |
| | AUDIO | null | ENGLISH | 17 | 22 |

Rows: 310(0), 310(1), 310(2)

DISTRIBUTING TASKS TO WORKERS IN A CROWD-SOURCING WORKFORCE

BACKGROUND OF THE INVENTION

Field of the Invention

Embodiments of the present invention generally relate to cloud computing systems and, more specifically, to distributing tasks to workers in a crowd-sourcing workforce.

Description of Related Art

Networked computing environments have enabled the ability to outsource certain tasks or services to large groups of workers via an online community. Tasks and services may be outsourced to such an online community instead of or in addition to assigning these tasks or services to employees or contractors. This outsourcing approach is known as crowd-sourcing, and is distinguished from traditional outsourcing in that the work is performed by a largely undefined crowd of workers (referred to herein as "crowd workers") rather than through one or more well-defined external workforce suppliers.

Through crowdsourcing, a large set of tasks may be performed by a large group of self-identified workers, such as workers managed by one or more outside agencies, at a reduced cost and greater efficiency than traditional outsourcing approaches. Each task may be divided into smaller subtasks. Each crowd worker is then assigned to complete a task or, if a task is divided into subtasks, one or more of the subtasks, after which the crowd worker completes the assigned work, where the assigned work includes tasks and/or subtasks. Over time, all the work is performed by the group of crowd workers, resulting in the completion of all the tasks. The process is iterative, where new tasks are continuously added and assigned to crowd workers, and the crowd workers continuously complete the previously assigned tasks and subtasks.

One drawback of the above approach is that tasks are typically assigned without regard to skill or experience of the individual crowd worker. Each crowd worker that logs into the crowdsourcing application is assigned the next task in the task queue, even if the crowd worker has a relatively low skill level to perform the particular task.

In one example, the tasks in the task queue could be to perform a quality control check on a portion of media content, such as a five minute video or audio segment of a movie, or subtitles and closed captioning text for the movie. Some crowd workers may be more adept at checking video or audio quality, while other crowd workers may be more skilled in checking subtitles or closed captioning. In addition, some crowd workers may complete tasks more correctly or efficiently than other workers. However, a given task is assigned to the next crowd worker who is available to complete the task, even if there is another available crowd worker who has greater skill or efficiency to complete the task. As a result, tasks completed via crowdsourcing may suffer in terms of reduced efficiency or quality relative to more traditional work assignment approaches.

As the foregoing illustrates, what is needed is a more effective way to assign tasks to crowd workers when crowd-sourcing work.

SUMMARY OF THE INVENTION

One embodiment of the invention disclosed herein provides a computer-implemented method for distributing tasks to skilled workers participating in a managed crowd-sourcing workforce. The method includes receiving a request for a task assignment from a first worker participating in the crowd-sourcing workforce. The method further includes retrieving one or more scores associated with the first worker, wherein each score is related to the performance of the first worker with respect to completing a prior set of task assignments. The method further includes determining that a first task assignment included in a first set of task assignments is related to a first score included in the one or more scores. The method further includes determining whether to route the first task assignment to the first worker for completion based on the first score and one or more routing rules.

Other embodiments include, without limitation, a computer-readable medium that includes instructions that enable a processing unit to implement one or more aspects of the disclosed methods as well as a computing device configured to implement one or more aspects of the disclosed methods.

One advantage of the disclosed techniques is that tasks assigned via crowdsourcing are completed more efficiently and with higher quality than under previous approaches.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that embodiments of the present invention may be practiced without one or more of these specific details.

Figure 1:
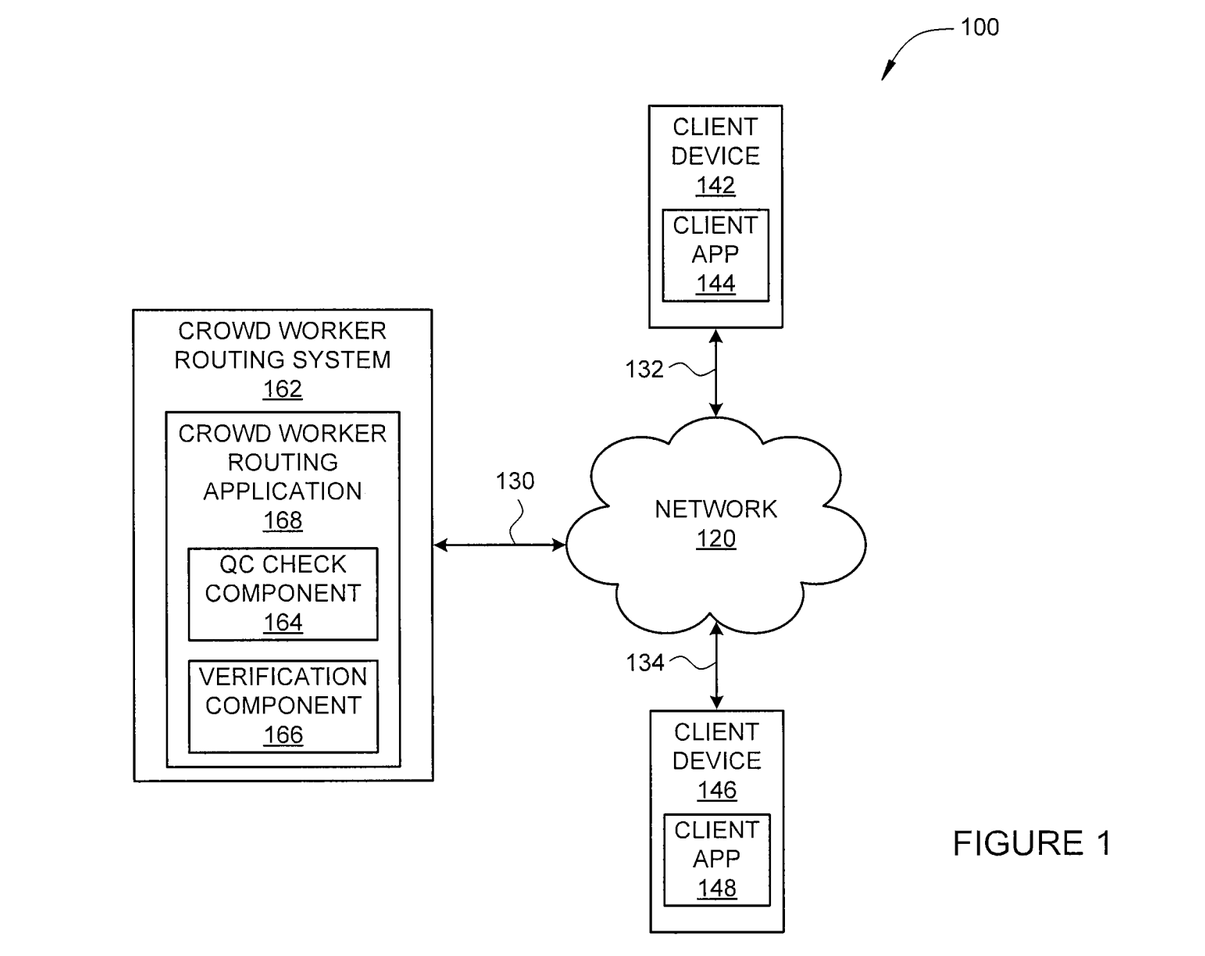
FIG. 1 illustrates a networked computing system configured to implement one or more aspects of the present invention.

FIG. 1 illustrates a networked computing system 100 configured to implement one or more aspects of the present invention. As shown, the networked computer system 100 includes client devices 142 and 146 connected to a crowd worker routing system 162 via a network 120. The network 120 may be any suitable environment to enable communications among remotely located computer systems, including, without limitation, a LAN (Local Area Network) and a WAN (Wide Area Network).

The client device 142 is configured to execute a client application (client app) 144, which is, in turn, configured to request tasks from the crowd worker routing system 162, where a task involves completion of a QC check on a media source asset, also referred to as an asset. The client device 142 communicates with the crowd worker routing system 162 over the network 120 via communications link 132.

Likewise, the client device 146 is configured to execute a client application (client app) 148, which is, in turn, configured to request tasks from the crowd worker routing system 162, where a task involves completion of a QC check task on a media source asset. The client application 148 may also be configured to receive a task assignment to complete a verification of a prior QC check task performed by a different crowd worker. The client device 146 communicates with the crowd worker routing system 162 over the network 120 via communications link 134.

The crowd worker routing system 162 includes a crowd worker routing application 168, which, in turn, includes a quality control (QC) check component 164 and a verification component 166, stored in memory and executing on the crowd worker routing system 162. The QC check component 164 routes QC check tasks to users of various client devices, such as client devices 142 and 146. As further described herein, the QC check component 164 routes tasks to a specific crowd worker based on a category associated with the skill and efficiency of the crowd worker to complete tasks of a particular type. The crowd worker is assigned to a category based on a score that measures the performance of the crowd worker to complete certain tasks and a quantity that measures the quantity of similar tasks completed by the crowd worker. The verification component 166 assigns all or a subset of the completed QC check tasks to verifiers who determine whether the result of a particular QC check task is correct or incorrect. The verification component 166 then adjusts the score of the crowd worker, the verifier, or both the crowd worker and the verifier. The adjusted score is then used to assign future tasks to the crowd worker. The crowd worker routing system 162 communicates with the client devices 142 and 146 over the network 120 via communications link 130.

The crowd worker routing system 162 is now described in greater detail below.

Figure 2:
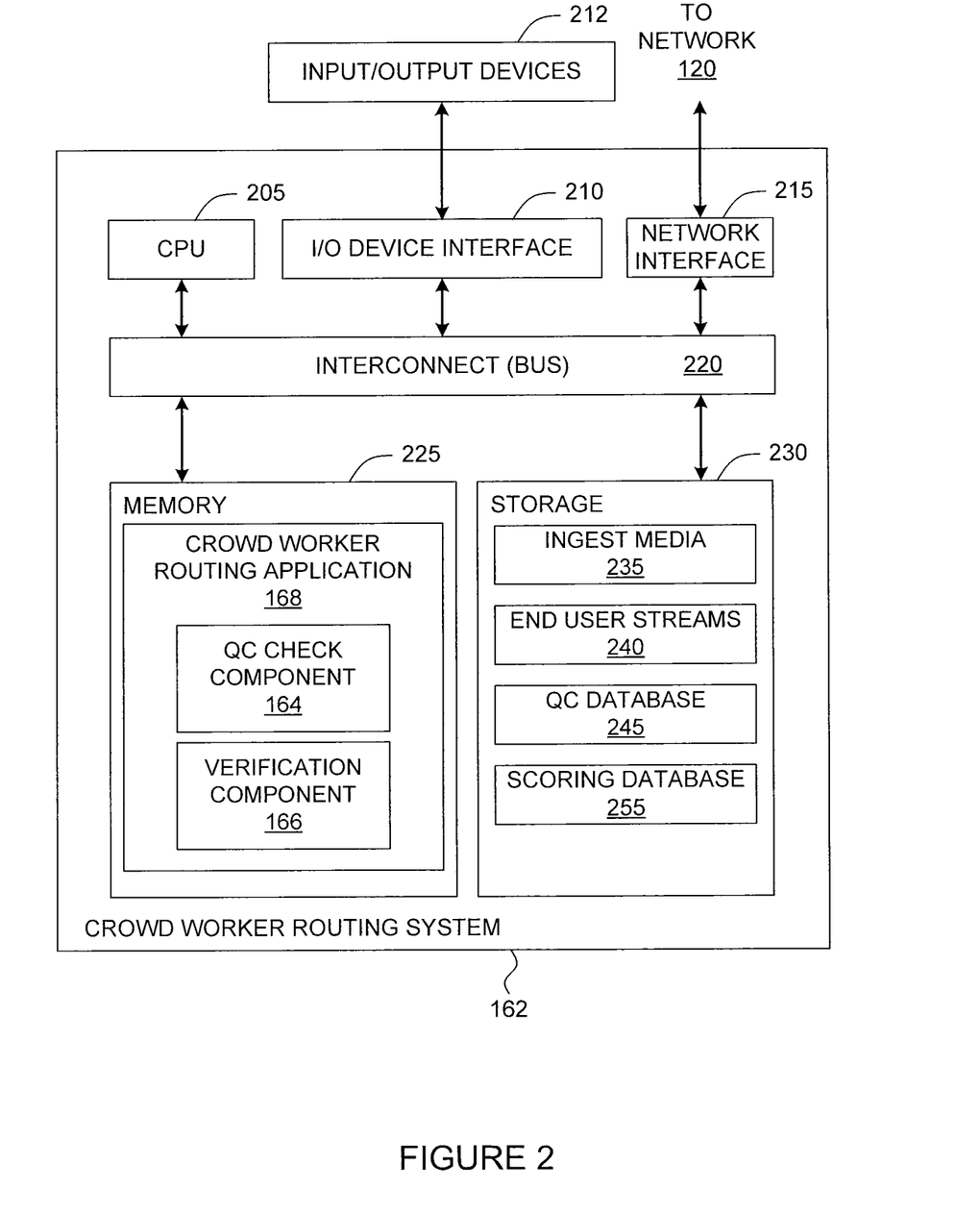
FIG. 2 illustrates the crowd worker routing system of FIG. 1, according to one embodiment of the invention.

FIG. 2 illustrates the crowd worker routing system 162 of FIG. 1, according to one embodiment of the invention. As shown, the crowd worker routing system 162 includes, without limitation, a central processing unit (CPU) 205, a network interface 215, an interconnect (bus) 220, a memory 225, and storage 230. The crowd worker routing system 162 may also include an input/output (I/O) device interface 210 connecting user input/output devices 212 (e.g., keyboard, display and mouse devices) to the crowd worker routing system 162.

In some embodiments, the crowd worker routing system 162 may include one or more nodes, where each node may be a physical computing machine that connects to the network 120. Crowd workers may connect to one or more nodes of the crowd worker routing system 162 via network 120 to request and complete task assignments. The quantity of nodes participating in the crowd worker routing system 162 may increase or decrease dynamically depending on changes in the computational demands placed on the crowd worker routing system 162 by crowd workers in the process of requesting and completing assigned tasks.

In general, the CPU 205 retrieves and executes programming instructions stored in the memory 225. Similarly, the CPU 205 stores and retrieves application data residing in the memory 225. The interconnect 220 facilitates transmission of programming instructions and application data between the CPU 205, input/output device interface 210, storage 230, network interface 215, and memory 225. CPU 205 is included to be representative of a single CPU, multiple CPUs, a single CPU having multiple processing cores, and the like. The memory 225 is generally included to be representative of a random access memory. The storage 230 may be a disk drive storage device. Although shown as a single unit, the storage 230 may be a combination of fixed and/or removable storage devices, such as fixed disc drives, floppy disc drives, tape drives, removable memory cards, optical storage, network attached storage (NAS), or a storage area-network (SAN).

Illustratively, the memory 225 includes a crowd worker routing application 16n that, in turn, includes a QC check component 164 and a verification component 166. The storage 230 includes ingest media 235, end user streams 240, a quality control (QC) database 245, and a scoring database 255.

The QC check component 164 routes task assignments to crowd workers and collects QC check results into the QC database 245. The QC check component 164 detects that a new media source asset has been ingested from a source partner and stored in the ingest media 235. An encoding application (not shown) retrieves the media source asset from the ingest media 235, encodes the media source asset into one or more end user bit streams, and stores the end user bit streams into the end user streams 240. The encoding application may encode the media source asset into several end user bit streams, where each end-user bit stream is encoded at different bit rates, corresponding to different quality levels and different bandwidth requirements needed to stream the end user bit stream over the network 120. In various embodiments, the encoding application may be embedded into the QC check component 164 or may be a separate application.

The QC check component 164 creates a group of crowd worker task assignments, where each task assignment involves completing a QC check on pre-defined sections of the media source asset or corresponding end-user bit stream. In one example, pre-determined or random sections of a two hour movie could be checked and supplied as a single task assignment that involves a spot QC check of a five minute view duration consisting of one minute views of five different sections of the movie. If the movie is scheduled for a complete QC check (full QC), then the QC check component 164 would create a single task assignment for the entire movie. The task assignments could be further subdivided by a number of parameters, including, without limitation, media type, media subtype, and language. For example, the QC check component 164 could create separate tasks for completing a spot QC check or a full QC check on the video, English audio, French audio, English closed caption, and Spanish subtitles of the media source asset. The QC check component 164 would then place the created task assignments onto a task queue. The QC check component 164 could inform appropriate crowd workers of available task assignments, such as by sending an email, or could wait until crowd workers log in and request task assignments. Alternatively, the QC check component 164 could inform only highly skilled crowd workers of the availability of new task assignments.

When a crowd worker is available for receiving task assignments, the crowd worker logs into an account associated with the QC check component 164 and requests a task assignment from the task queue. The QC check component 164 determines a category for a requesting crowd worker that corresponds to the skill level and experience of the crowd worker to complete the various unassigned tasks in the task queue. As further described herein, the category indicates whether the skill level of the crowd worker has high, medium, or low skill in completing a particular type of task assignment. For example, a crowd worker may be in a high skill category for video QC checking, a medium skill category for English audio QC checking, and a low skill level for Spanish subtitle QC checking. The QC check component 164 selects a task assignment from the task queue where the crowd worker is in a high skill category, if such a task assignment is available. Alternatively, the QC check component 164 selects a task assignment from the task queue where the crowd worker is in a medium skill category. If all task assignments in the task queue correspond to areas where the crowd worker is in a low skill category, or where the crowd worker fails to meet one or more other routing criteria according to one or more routing rules, the QC check component 164 may inform the crowd worker that no tasks are currently available for assignment.

The crowd worker completes the task assignment by retrieving the assigned segment of the media source asset from the end user streams 240, or, alternatively, the ingest media 235. The crowd worker evaluates the segment based on the assignment, such as video, English audio, Spanish subtitles, and enters the result of the QC check. For example, if the crowd worker determines that the segment is acceptable based on the assignment, then the crowd worker would enter a "no issues" result. If the crowd worker determines that the segment is not acceptable based on the assignment, then the crowd worker would enter a "failure issues" result that identifies the nature of the failure issue, including, without limitation, the time at which the failure issue occurs, the type of failure, and additional comments to assist a verifier in finding the failure issue and flagging the failed segment for correction. The QC check component 164 stores the QC check results, as entered by the crowd worker, into the QC database 245. When all task assignments for a media source asset are completed successfully, the associated end user streams 240 are posted to one or more streaming servers and made available for users to stream.

The verification component 166 manages the verification of a subset of the completed task assignments and updates crowd worker scores in the scoring database 255, which, in turn, affects future routing of task assignments by the QC check component 164. The verification component 166 assigns a portion of the completed task assignments to one or more verifiers for a second pass QC check. The verifiers may be trusted crowd workers who complete their own task assignments and, in addition, verify QC check results of other crowd workers. Alternatively, verifiers may complete only verification tasks exclusively. When a verifier logs in, the verification component 166 presents a verification task to the verifier. The verification component 166 retrieves the segment of the media source asset from the end user streams 240 or, alternatively, from the ingest media 235. The verification component 166 also retrieves the corresponding QC check results from the QC database 245. The verifier then evaluates the segment in light of the QC check results, and enters either "correct" if the verifier agrees with the crowd worker results or "incorrect" if the verifier disagrees with the results. The verification component 166 then updates the score of the crowd worker who performed the original QC check, raising the score if the verifier enters "correct" and lowering the score if the verifier enters "incorrect."

The crowd worker may have multiple scores, corresponding to different groups of task assignments as determined by the various types, subtypes, and languages associated with the task assignment. For example, if the verifier agrees with QC check results for an English audio task assignment, then the verification component 166 would increase the crowd worker's score for English audio tasks. If the verifier disagrees with QC check results for a Spanish subtitle task assignment, then the verification component 166 would decrease the crowd worker's score Spanish subtitle tasks. The verification component 166 stores the updated score into the scoring database 255. The updated scores are then retrieved from the scoring database 255 by the QC check component 164 when assigning future tasks. The QC check component 164 may determine that an increased score places the crowd worker in a higher skill category or a decreased score places the crowd worker in a lower skill category.

The verification component 166 selects a portion of the completed assignments for verification on the basis of one or more rules. In one example, all task assignments completed by a new crowd worker could be selected for verification until the crowd worker has completed a minimum number of task assignments. In another example, 100% of tasks completed by a crowd worker that result in a failure issue and 10% of completed tasks resulting in no issues could be selected for verification. In yet another example, 5% of all tasks completed by a crowd worker could be selected for verification, regardless of whether a failure issue is found.

The ingest media 235 stores media source assets ingested from source partner. The media source assets are scheduled for encoding into one or more end user bit streams. The end user streams 240 stores media source assets that have been encoded one or more bit rates suitable for streaming to end users. The QC database 245 stores scoring results as determined by the verification component 166 and retrieved by the QC check component 164 when making task assignments.

In one embodiment, each crowd worker may be placed into one of four categories for each group of task assignments associated with a particular asset type, subtype, and language. Three of the categories may correspond to a high skill level, medium skill level, and low skill level. A fourth category may define the crowd worker as "in training" for the corresponding type of task assignment. Initially, a crowd worker may be placed in the training category and assigned a fixed number of assets to check. The task assignments may be pulled from the main task queue. Alternatively, the task assignments may be from a set of training task assignments. After completing the fixed number of training task assignments, the crowd worker may be placed into one of the other three categories, depending on the score achieved for the training task assignments. For example, if the scores range from 0 to 100, then the crowd worker could be placed in the low, medium, or high skill bucket for scores in the range of 0-29, 30-59, or 60-100, respectively. The ranges may be adjusted to change the behavior of how tasks are routed to crowd workers. In one embodiment, the QC check application automatically changes the ranges based on the number of available crowd workers and the number and type of task assignments in the task queue. Alternatively, task assignments may be routed to each crowd worker on the basis of an overall ranking as compared to all other crowd workers rather than on the basis of being in a particular range of scores.

As a result, new crowd workers undergo a training period to gain an initial skill level and efficiency. At the end of the training period, the performance of the skill worker during the training period establishes the new crowd worker's initial score. The crowd worker then develops additional skill and efficiency by completing task assignments over time. As a crowd worker increases in skill and efficiency, the crowd worker's scores are likely to increase, placing the crowd worker in higher skill categories. Crowd workers in the high skill category may receive an unlimited number of task assignments. When a highly skilled crowd worker completes a task assignment, the crowd worker may pull additional tasks from the task queue without restriction. Verifiers may be selected from among the crowd workers in the high skill category. Crowd workers in the medium skill category may receive a maximum number of task assignments per day. When a medium skilled crowd worker completes a task assignment, the crowd worker may pull additional tasks from the task queue until the crowd worker completes the maximum number of daily task assignments. Crowd workers in the low skilled category may receive no task assignments.

In some embodiments, some media source assets may be identified of high importance, such as a new movie release or for unreleased episodes of an original series. In such embodiments, task assignments corresponding to a high importance media source asset may be assigned only to crowd workers in the high skill level category. Task assignments corresponding to a media source asset that is not identified as high importance may be assigned to any available crowd workers. Such a policy increases the likelihood that task assignments with higher importance are completed faster and performed by more highly skilled crowd workers relative to task assignments with lower importance.

In some embodiments, task assignments may be routed differently based on whether a media source asset is scheduled for a full QC or a spot QC. Task assignments may also be routed differently based on the maximum task completion time that a crowd worker or group of crowd workers agrees to. For example, spot QC task assignments could be routed only to crowd workers in the high and medium skill categories who commit to completing each task assignment within 48 hours of receive the task assignment. Full QC task assignments could be routed only to crowd workers in the high skill categories who commit to completing each task assignment within 24 hours of receive the task assignment. The full QC task assignments could be assigned before spot QC task assignments to prioritize completion of the full QC task assignments. Such a policy increases the likelihood that full QC task assignments are completed faster and performed by more highly skilled crowd workers relative to spot QC task assignments.

In one embodiment, crowd workers receive task assignments via an integrated routing approach, where a given crowd worker is placed into a category based on both the crowd worker's individual score and a composite score of a group of crowd workers that includes the given crowd worker. For example, the crowd worker may work for a service provider that employs multiple crowd workers. The composite score for the group of crowd workers may be determined via any technically feasible approach, such as the mean score, median score, or best score of the group of crowd workers. If both the individual score and the composite score are in the high skill category, then the crowd worker may receive unlimited task assignments and be selected to be a verifier. If the individual score, the composite score, or both are in the medium skill category, and neither the individual score nor the composite score are in the low skill category, then the crowd worker may receive task assignments up to a maximum number of assignments per day. If the individual score, the composite score, or both are in the low skill category, then the crowd worker may receive no task assignments. The employer may receive the composite score and the individual crowd worker scores as a motivation to move the crowd workers into higher skill categories. A crowd worker with a high individual score in a group with a low composite score may transfer to a different employer with a higher composite score. In so doing, the highly skilled worker may take the high individual score to the new employer, thus increasing the ability of the highly skilled crowd worker to receive a higher number and more prestigious task assignments. Such a policy encourages the service provider to increase the overall skill and efficiency of all crowd workers who work for the service provider. As a result, groups of crowd workers working for a common service provider are incented to increase in skill and efficiency, further improving accurate and prompt completion of task assignments.

In various embodiments, the crowd worker routing system 162 may be implemented on a single physical machine or on a distributed computing system that includes multiple physical machines. The QC check component 164 and the verification component 166 may be configured to execute on the same physical machine or on separate physical machines. In addition, the QC check component 164, the verification component 166, or both the QC check component 164 and the verification component 166 may be configured to simultaneously execute on multiple machines in a distributed computing system. Any one or more of the ingest media 235, the end user streams 240, the QC database 245, and the scoring database 255 may reside on the same physical machine as either or both of the QC check component 164 and the verification component 166. Alternatively, any one or more of the ingest media 235, the end user streams 240, the QC database 245, and the scoring database 255 may reside on a dedicated server that does not include either the QC check component 164 or the verification component 166. In one embodiment, both the QC check component 164 and the verification component 166 execute on each node in a set of nodes, while the QC database 245 and the scoring database 255 reside on a separate node dedicated to store and manage the QC database 245 and the scoring database 255.

The crowd worker records in the scoring database 255, as updated by the verification component 166, are retrieved by the QC check component 164 in order to determine how to route task assignments to the available crowd workers. The various fields in the scoring database 255 record each crowd worker's skill level for various classes of task assignments, as further described below.

Figure 3:
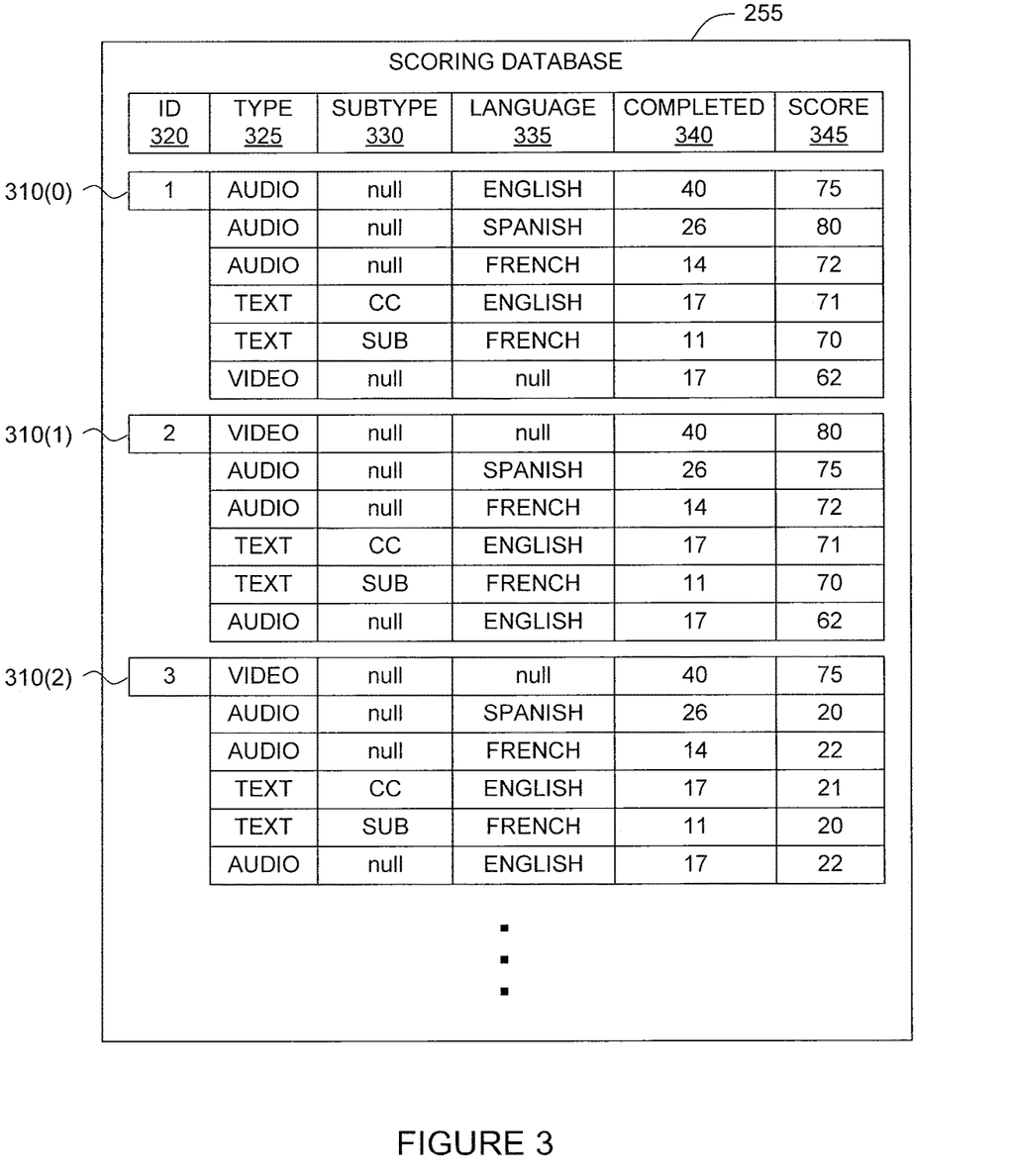
FIG. 3 illustrates the scoring database of FIG. 2, according to one embodiment of the present invention.

FIG. 3 illustrates the scoring database 255 of FIG. 2, according to one embodiment of the present invention. As shown, the scoring database 255 includes three exemplary crowd worker scoring records 310(0), 310(1), and 310(2).

The first crowd worker scoring record 310(0) is associated with various fields, including, without limitation, a user identifier (ID) 320, an asset type (type) 325, an asset subtype (subtype) 330, an asset language (language) 335, a quantity of completed tasks (completed) 340, and a score 345.

The user identifier 320 indicates the identity of a particular crowd worker. As shown, the user identifier 320 for the first crowd worker scoring record 310(0) is "1" to indicate a particular crowd worker with the number 1. Any suitable technique may be used to assign a unique user identifier 320 to each crowd worker, including, without limitation, a numeric value, a user login name, and a natural name. Each user identifier 320 may be associated with multiple asset types and subtypes, and languages, as further described below.

The asset type 325 indicates the types of assets for which the crowd worker associated with the first crowd worker scoring record 310(0) has completed at least one task. As shown, the crowd worker associated with the first crowd worker scoring record 310(0) has completed tasks for audio, text, and video assets.

The asset subtype 330 indicates the subtypes of assets, within the various asset types, for which the crowd worker associated with the first crowd worker scoring record 310(0) has completed at least one task. As shown, the crowd worker associated with the first crowd worker scoring record 310(0) has completed text tasks involving both closed-caption (CC) and subtitle (SUB) asset subtypes 330. The asset subtype 330 for audio and video asset types is shown as "null" indicating that the asset subtype 330 field is not used for audio and video asset types. In one embodiment, the asset subtype 330 field may be used for audio asset types, video asset types, or both. For example, the audio asset subtype 330 field for audio asset types could differentiate among various audio sources, including, without limitation, the main audio of a movie, audio associated with director comments, and audio associated with a second audio program. Likewise, the asset subtype 330 field for video asset types could be used to differentiate among various video sources, including, without limitation, a standard definition version, one or more high-definition versions, a 4 k resolution version, and three-dimensional (3D) presentations of any one or more of these resolutions.

The asset language 335 indicates the language associated with the particular asset type and subtype. As shown, the crowd worker associated with the first crowd worker scoring record 310(0) has completed audio tasks involving English, French, and Spanish assets, closed caption tasks involving English assets, and subtitle tasks involving French assets. The asset language 335 for video asset types is shown as "null" indicating that the subtitle field is not used for video asset types.

The quantity of completed tasks 340 indicates the quantity of tasks completed by the crowd worker associated with the first crowd worker scoring record 310(0). As shown, the crowd worker completed 40 audio tasks in English, 26 audio tasks in Spanish, 14 audio tasks in French, 17 closed caption text tasks in English, 11 subtitle text tasks in French, and 17 video tasks.

The score 345 indicates the current score corresponding to the crowd worker associated with the first crowd worker scoring record 310(0). As shown, the crowd worker has a current score of 75 for audio tasks in English, 80 for audio tasks in Spanish, 72 for audio tasks in French, 71 for closed caption text tasks in English, 70 for subtitle text tasks in French, and 62 for video tasks. The score may represent an average score for a sliding duration, such as ninety days, such that the score is based only on tasks completed during the last ninety days.

In some embodiments, the score is based on other parameters and characteristics. For example, the score could be based on the percentage of completed task assignments that resulted in a failure issue and where the verifier agreed with the failure issue result. In another example, the score could decrease if a completed task that resulted in no issues subsequently is determined to have a failure issue on a random verify. In another example, the score may be increased or decreased based on the amount of time a crowd worker takes to complete a task assignment or on the number of task assignments completed within a given time period. In yet another example, the score could be updated if an asset posted for streaming has a failure issue that should have been found during task assignment. If neither the crowd worker nor the verifier found the failure issue, then the score for both the crowd worker and the verifier may decrease. If the crowd worker found the failure issue, and the verifier entered an "incorrect" verification result, then the score for the crowd worker may increase while the score for the verifier may decrease.

The crowd worker routing system 162 determines a category for the crowd worker based at least in part on the quantity of completed tasks 340 and score 345 associated with the asset types 325, asset subtypes 330, and asset language 335 for which the crowd worker has completed at least one task. The crowd worker associated with the first crowd worker scoring record 310(0) scored highest for Spanish audio tasks and second highest for English audio tasks, and has completed a relatively high number of tasks in these two areas. As a result, the crowd worker routing system 162 may place the crowd worker in the highest category for these two areas. The crowd worker scored somewhat lower for the tasks in the other four areas and completed a somewhat lower quantity of tasks. As a result, the crowd worker routing system 162 may place the crowd worker in a middle category for these two areas. The crowd worker may then receive more Spanish audio tasks and English audio tasks, relative to other task types.

The second crowd worker scoring record 310(1) functions substantially the same as the first crowd worker scoring record 310(0), except as further described below. The second crowd worker scoring record 310(1) shows an identifier 320 of 2. The crowd worker associated with the second crowd worker scoring record 310(1) scored highest for video tasks and second highest for Spanish audio tasks, and has completed a relatively high number of tasks in these two areas. As a result, the crowd worker routing system 162 may place the crowd worker in the highest category for these two areas. The crowd worker scored somewhat lower for the tasks in the other four areas and completed a somewhat lower quantity of tasks. As a result, the crowd worker routing system 162 may place the crowd worker in a middle category for these two areas. The crowd worker may then receive more video tasks and Spanish audio tasks, relative to other task types.

The third crowd worker scoring record 310(2) functions substantially the same as the first crowd worker scoring record 310(0) and the second crowd worker scoring record 310(1), except as further described below. The third crowd worker scoring record 310(2) shows an identifier 320 of 3. The crowd worker associated with the third crowd worker scoring record 310(2) scored relatively high for video tasks and completed a relatively high quantity of tasks in this area. The crowd worker scored relatively low in all other asset areas for which the third crowd worker has competed at least one task. As a result, the crowd worker routing system 162 may place the crowd worker in the highest category for video asset tasks and in the lowest category for the other five areas. The crowd worker may then receive video asset tasks, if available, but may receive few or no tasks in any of the other five areas.

Crowd workers typically access QC check and verification task assignments via one or more user interface screens configured to assist crowd workers in completing the task assignments, as further described below.

Figure 4A:
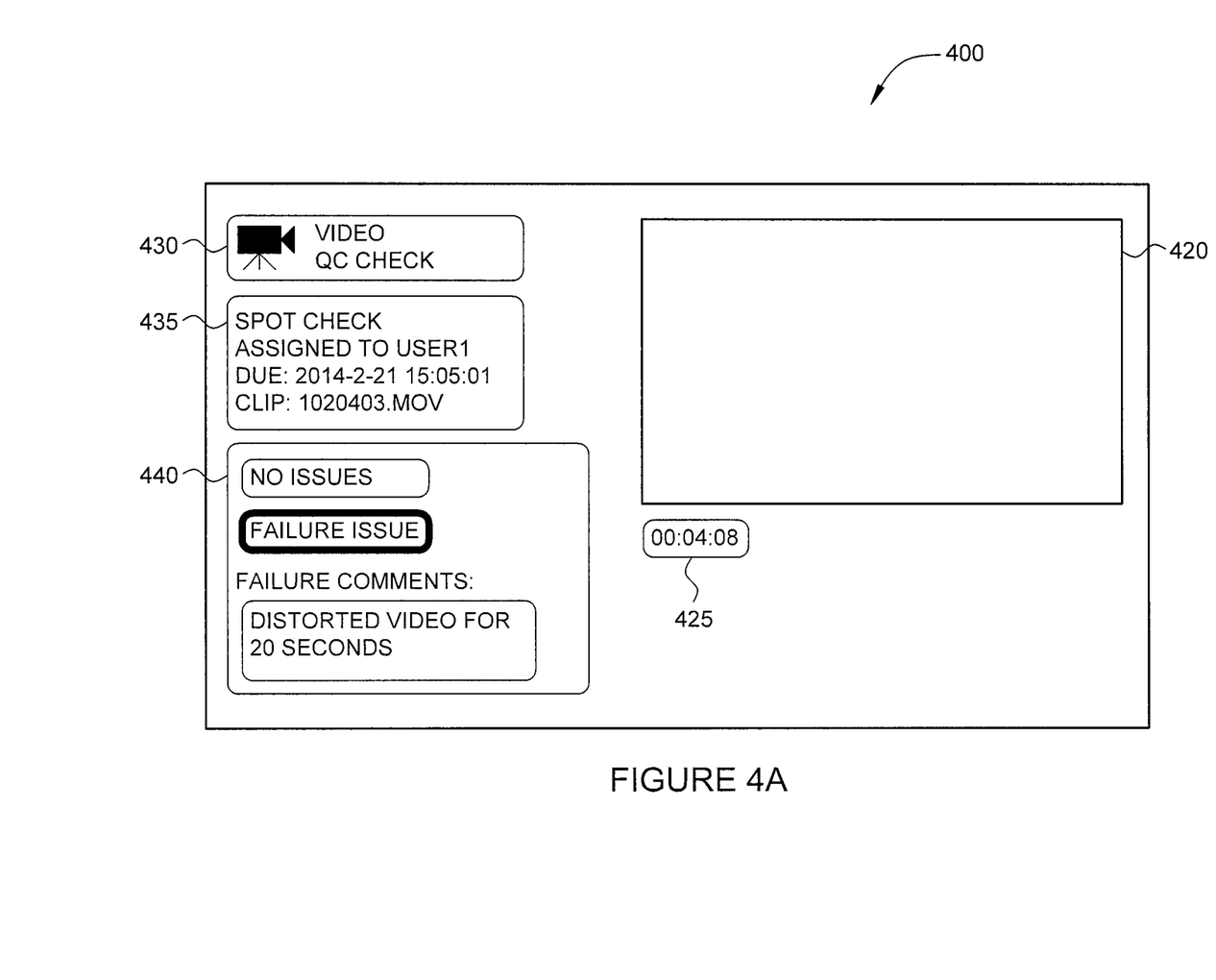
FIG. 4A illustrates a screen shot associated with the quality control (QC) check application of FIG. 1, according to one embodiment of the present invention.

FIG. 4A illustrates a screen shot 400 associated with the quality control (QC) check component 164 of FIG. 1, according to one embodiment of the present invention. As shown, the screen shot 400 associated with the QC check component 164 includes a media window 420, a time code display 425, a task assignment identification window 430, a task assignment details window 435, and a QC check results window 440.

The media window 420 displays content associated with the current task assignment. For example, the media window 420 could display a video clip of a portion of a media source asset that is undergoing a QC check. Alternatively, the media window 420 could display subtitles or closed caption text superimposed over a video clip of a portion of a media source asset that is undergoing a QC check.

The time code display 425 indicates a time code associated with the content displayed in the media window 420. For example, if the media window 420 displays video content associated with a current task assignment, then the time code display 425 indicates a point in time associated with the currently displayed image frame in the media window 420. As shown, the time code display 425 indicates a value of 4:08, identifying that the current image frame in the media window 420 is associated with a time value of 4 minutes and 8 seconds. Although the time code is illustrated with a particular format, the time code may be displayed in any technically feasible format. The time value in the time code display 425 may be captured when a failure issue is recorded for the current task assignment to facilitate verification and correction of the failure issue.

The task assignment identification window 430 illustrates basic information regarding the current task assignment, including, without limitation, the type of media source asset being evaluated and the assignment category. As shown, the task assignment identification window 430 indicates that a video source is being evaluated in association with a QC check task assignment.

The task assignment details window 435 illustrates additional information regarding the current task assignment, including, without limitation, the type of QC check being performed, the assigned user, the due date and time, and the name of the clip associated with the task assignment. As shown, the task assignment details window 435 indicates that the current task assignment is a spot check assigned to user1. The assignment is due on Feb. 21, 2014 at 15:05:01 and is associated with a clip entitled 1020403.mov.

The QC check results window 440 receives status of the QC check result from a crowd worker. The crowd worker may select the "no issues" button or the "failure issue" button to indicate whether the QC check resulted in no QC check issues for the current task assignment or in a failure issue, respectively. In addition, the QC check results window 440 includes a failure comment window, where the crowd worker can enter remarks for task assignments that result in one or more failure issues in order to facilitate verification or correction of the failure issues. As shown, the QC check results window 440 indicates a failure condition, as signified by the bold line surrounding the "failure issue" button. The failure comment window indicates that the failure is associated with distorted video for 20 seconds.

Figure 4B:
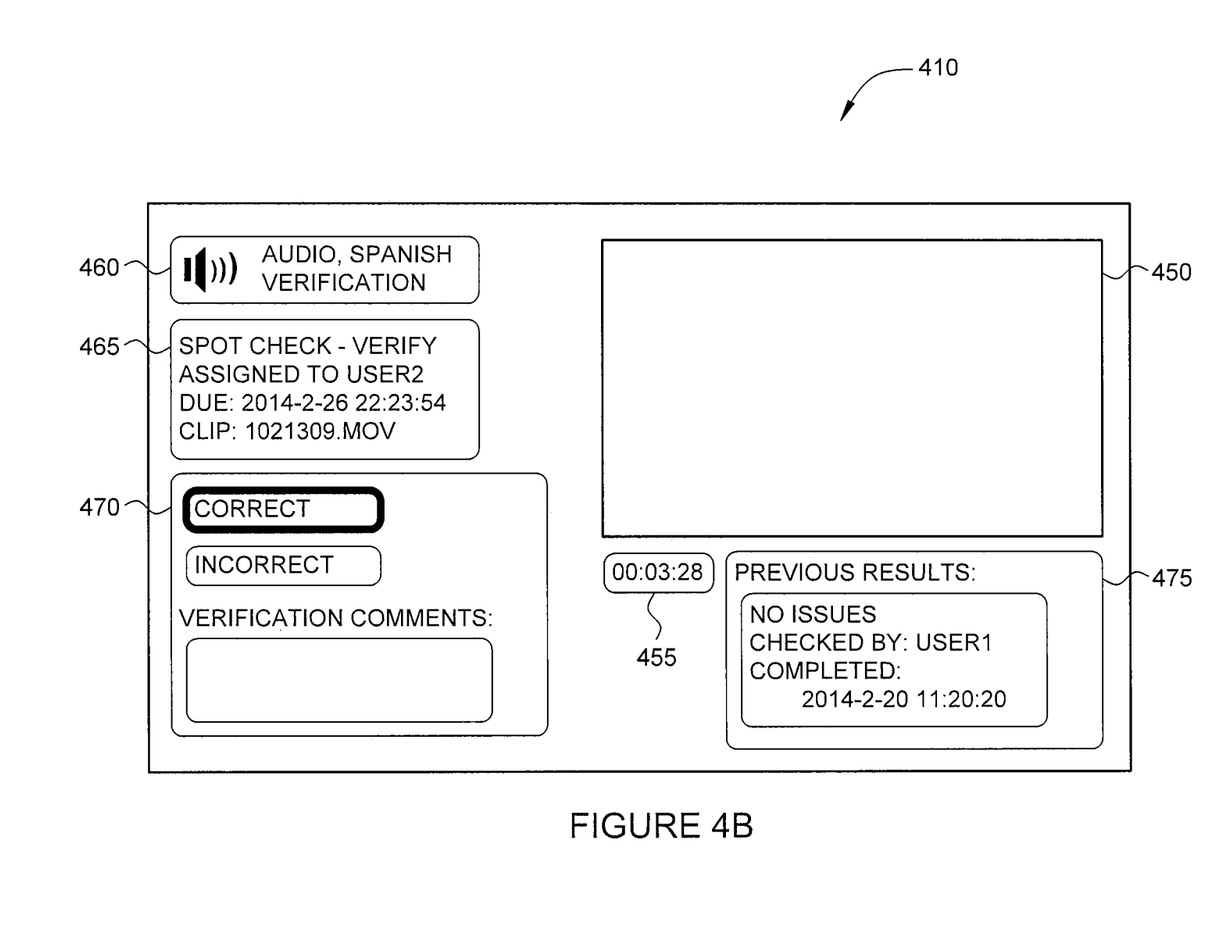
FIG. 4B illustrates a screen shot associated with the verification application of FIG. 1, according to one embodiment of the present invention.

FIG. 4B illustrates a screen shot 410 associated with the verification component 166 of FIG. 1, according to one embodiment of the present invention. As shown, the screen shot 410 associated with the verification component 166 includes a media window 450, a time code display 455, a verification assignment identification window 460, a verification assignment details window 465, a verification results window 470, and a previous QC check results window 475. The media window 450, the time code display 455, the verification assignment identification window 460, and the verification assignment details window 465 function substantially the same as their counterparts in FIG. 4A except as further described below.

The media window 450 displays content associated with the current verification task assignment. For example, the media window 450 could display a video clip of a portion of a media source asset that is undergoing verification. Alternatively, the media window 420 could display subtitles or closed caption text superimposed over a video clip of a portion of a media source asset that is undergoing verification.

The time code display 455 indicates a time code associated with the content displayed in the media window 450. For example, if the media window 450 displays video content associated with a current verification task assignment, then the time code display 455 indicates a point in time associated with the currently displayed image frame in the media window 450. As shown, the time code display 455 indicates a value of 3:28, identifying that the current image frame in the media window 450 is associated with a time value of 3 minutes and 28 seconds. Although the time code is illustrated with a particular format, the time code may be displayed in any technically feasible format.

The verification assignment identification window 460 illustrates basic information regarding the current verification task assignment, including, without limitation, the type of media source asset being evaluated and the assignment category. As shown, the task assignment identification window 460 indicates that a Spanish audio source is being evaluated in association with a verification task assignment.

The verification assignment details window 465 illustrates additional information regarding the current verification task assignment, including, without limitation, the type of verification being performed, the assigned user, the due date and time, and the name of the clip associated with the task assignment. As shown, the verification assignment details window 465 indicates that the current verification task assignment is a spot check verify assigned to user2. The assignment is due on Feb. 26, 2014 at 22:23:54 and is associated with a clip entitled 1021309.mov.

The verification results window 470 receives status of the verification result from a crowd worker tasked to verify a QC check result. The crowd worker may select the "correct" button or the "incorrect" button to indicate whether the crowd worker agrees or disagrees with the prior QC check result, respectively. In addition, the verification results window previous QC check results window 475 includes a verification comments window, where the crowd worker can enter remarks for verification task assignments to specify, for example, why the crowd worker disagrees with the prior QC check results. As shown, the verification results window 470 indicates that the crowd worker agrees with the prior QC check result, as signified by the bold line surrounding the "correct" button. The failure comment window is blank to indicate that no verification comments have been entered.

The previous QC check results window 475 displays the results of the previous QC check task assignment, including, without limitation, the QC check status result, the user that completed the QC check, and the date and time that the QC check assignment was completed. As shown, the previous QC check results window 475 indicates that the previous QC check resulted in a "no issues" condition. The QC check was performed by user1 and was completed on Feb. 20, 2014 at 11:20:20.

It will be appreciated that the system shown herein is illustrative and that variations and modifications are possible. In one example, particular embodiments are described using an example of a crowdsourcing application for performing QC checking on media associated with a service to stream movies, music, television programming, or user generated content, over a data communications network to end-user client devices. However, it should be understood that disclosed techniques may be adapted to any crowdsourcing application where quality and throughput may improve by routing tasks based on crowd worker skill and efficiency. Accordingly, references to a crowdsourcing application for QC checking and verification of media content are merely illustrative and not limiting.

In another example, although crowd workers and groups of crowd workers are described in the context of belonging to one of three categories. However, crowd workers and groups of crowd workers may be placed into any technically feasible quantity of categories, including less than three categories or more than three categories, and with a correspondingly different quantity of score ranges associated with the categories. In addition, the quantity of categories for individual crowd workers may differ from the quantity of categories for groups of crowd workers. The categories may be associated with any technically feasible set of rules defining a task assignment policy, including, without limitation, the maximum number of task assignment for a particular duration, the priority level of the media source asset undergoing QC check, and whether the media source asset is undergoing a full QC or a spot QC.

In yet another example, the scoring database 255 is described in the context of three records corresponding to three crowd workers. However, the scoring database 255 may be implemented with any technically feasible quantity of records. In addition, each record is described in the context of specific fields associated with a user identifier, a media type, a media subtype, a language, a completed number of task assignments and a score. However, the scoring database 255 may be implemented with any technically feasible subset of the described fields. In addition, the scoring database 255 may be implemented such that the records in the scoring database 255 have any quantity of additional fields, within the scope of the present invention.

Figure 5A:
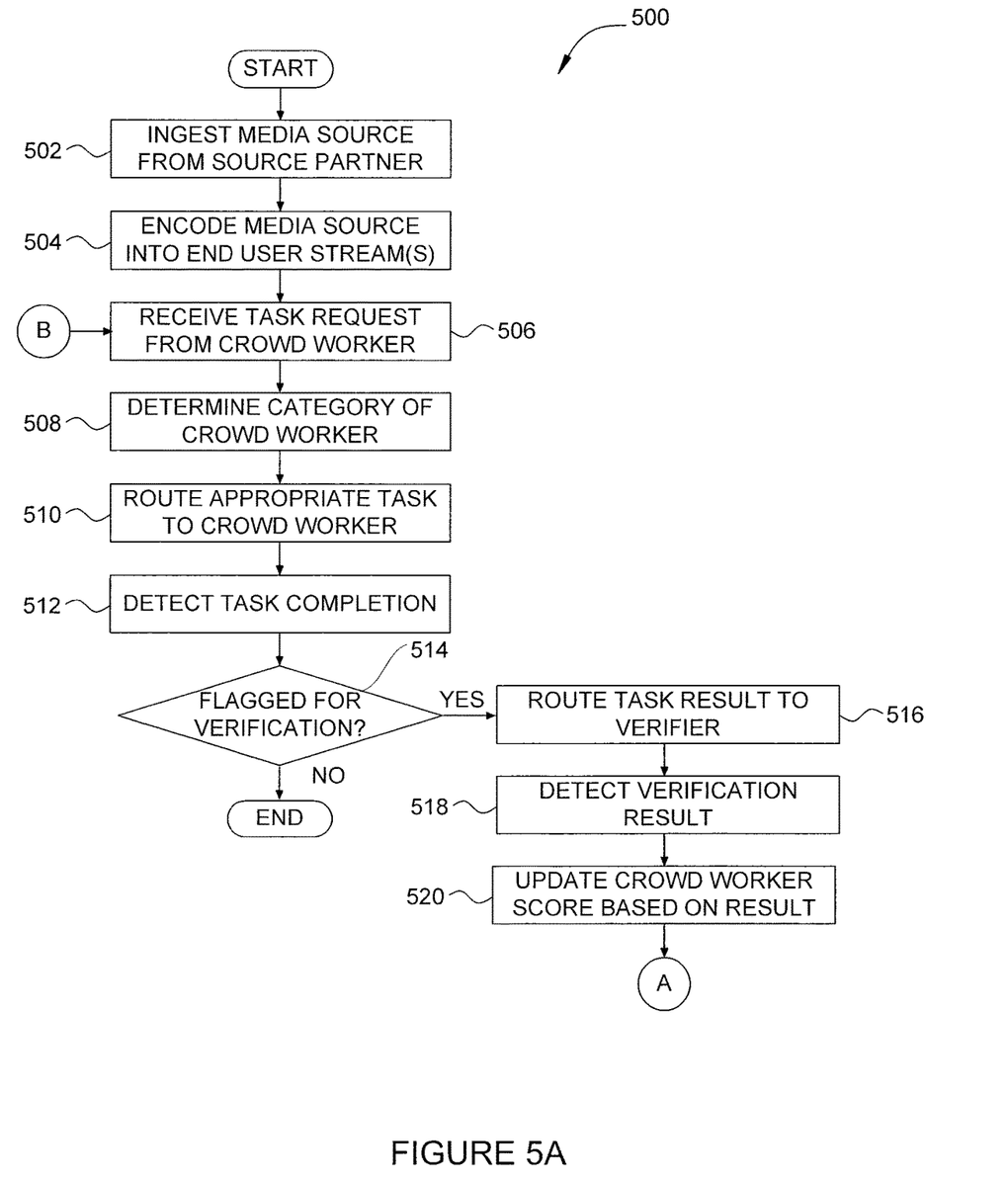
FIGS. 5A-B set forth a flow diagram of method steps for routing tasks to crowd workers, according to one embodiment of the present invention.
Figure 5B:
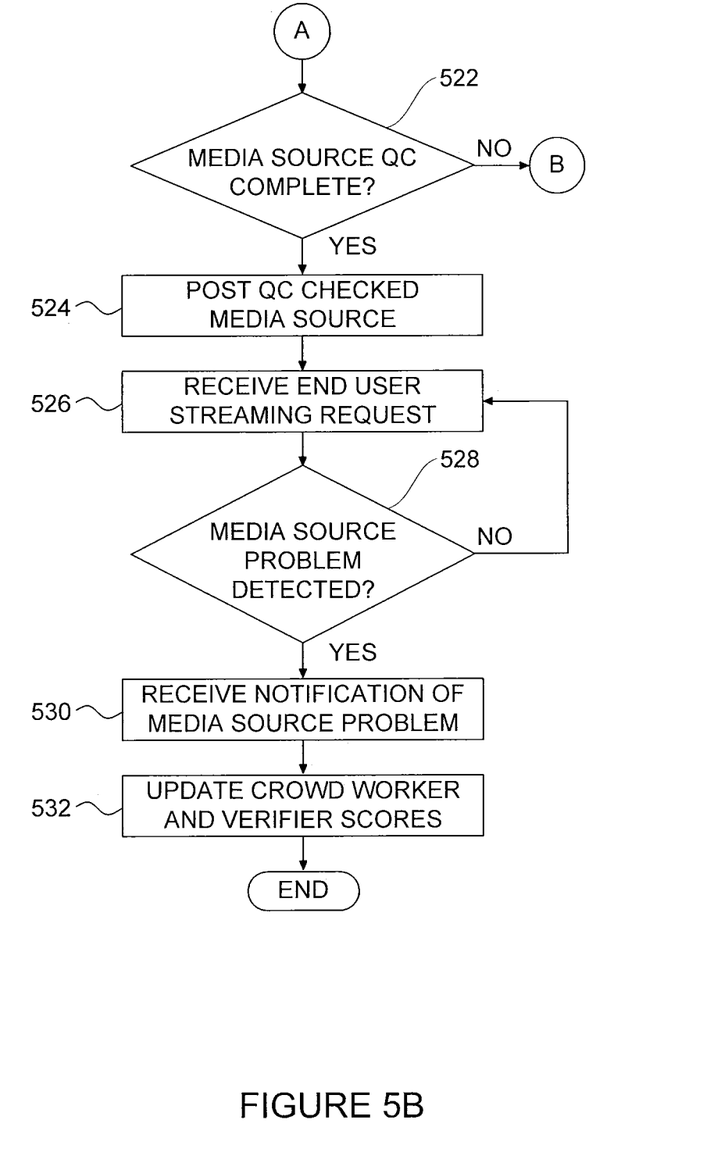

FIGS. 5A-B set forth a flow diagram of method steps for routing tasks to crowd workers, according to one embodiment of the present invention. Although the method steps are described in conjunction with the systems of FIGS. 1-4B, persons of ordinary skill in the art will understand that any system configured to perform the method steps, in any order, is within the scope of the present invention.

As shown, a method 500 begins at step 502, where a media encoding system associated with the crowd worker routing system 162 ingests a media source asset from a source partner. In various embodiments, the media source asset may be of any relevant media type, including, without limitation, a movie, a television program, or an advertisement. At step 504, the media encoding system encodes the media source asset into one or more end user streams 240, where each end user stream 240 is an encoded version of the media source asset at a particular bit rate suitable for streaming to end users. At step 506, the crowd worker routing system 162 receives a task request from a crowd source worker who has logged into the crowd worker routing system 162, such as a request for a task assignment to complete a QC check on a portion of or the entirety of an encoded user stream 240.

At step 508, the crowd worker routing system 162 determines the category of the crowd worker based on the current score of the crowd source worker to complete tasks related to various asset types and subtypes. A crowd worker with a higher score is placed into a higher category, increasing the likelihood that the crowd worker receives a task assignment. A crowd worker with a lower score is placed into a higher category, decreasing the likelihood that the crowd worker receives a task assignment. A crowd worker in a higher category is also more likely to receive more interesting or prestigious task assignments, such as QC checking for a new movie release or for unreleased episodes of an original series. At step 510, the crowd worker routing system 162 routes an appropriate task assignment to the requesting crowd worker. For example, the crowd worker routing system 162 could select a task involving an asset type for which the crowd worker has a score that places the crowd worker in a medium or high category. If the available tasks involve only those tasks where the crowd worker is in a low category, the crowd worker could receive a message that no tasks are available for assignment. As a result, the task assignment is routed dynamically and automatically to the crowd user based on the skill level of the crowd worker to complete the task assignment.

At step 512, the crowd worker routing system 162 detects that a task assigned to a crowd worker has been completed. At step 514, the crowd worker routing system 162 determines whether the completed task is flagged for verification. In one example, all tasks completed by a new crowd worker could be flagged for verification until the crowd worker has completed a threshold quantity of tasks. In another example, the work product of a particular crowd worker could be flagged for verification based on a specific rule, including, without limitation, verification only of QC checks resulting in failure issues, verification of all QC checks resulting in failure issues and 10% of QC check resulting in no issues, or verification of a randomly selected 5% of all QC checks. If, at step 514, the task is not flagged for verification, then the method 500 terminates.

If, however, at step 514, the task is flagged for verification, then the method 500 proceeds to step 516, where the crowd worker routing system 162 routes the completed task result to a verifier. At step 518, the crowd worker routing system 162 detects that the verifier has entered a verification result of the completed task result. At step 520, the crowd worker routing system 162 updates the score for the crowd worker based on the verification result, based on one or more of the type, subtype, and language of the checked asset. For example, the crowd worker routing system 162 could increase the score for the crowd worker if the verifier agrees with the completed task result, increasing the likelihood that the crowd worker is assigned to complete similar tasks. Alternatively, the crowd worker routing system 162 could decrease the score for the crowd worker if the verifier does not agree with the completed task result, decreasing the likelihood that the crowd worker is assigned to complete similar tasks.

At step 522, the crowd worker routing system 162 determines whether the QC check for the media source asset is complete by determining whether any remaining task assignments have yet to be completed for the media source asset. If the QC check for the media source is not complete, then the method 500 proceeds to step 506, described above. If, however, the QC check for the media source asset is complete, then the method 500 proceeds to step 524, where the crowd worker routing system 162 causes the QC checked media source asset, or one or more end-user streams 240 related to the media source asset, to be posted on one or more streaming media servers. As a result, the media source asset is available for streaming to end users. At step 526, a streaming media server receives an end user streaming request related to the posted media source asset. At step 528, the streaming media server determines whether a problem with the posted media source asset is detected. For example, the streaming media server could determine that a significant number of end users stop at or near the same point in time in the posted media source asset because the audio is out of synchronization with the video. If a problem with the posted media source asset is not detected, then the method proceeds to step 526, described above.

If, however, at step 528, a problem with the posted media source asset is detected, then the method 500 proceeds to step 530, where the crowd worker routing system 162 receives notification of the problem with the posted media source asset. At step 532, the crowd worker routing system 162 updates the scores for the QC checker and the verifier responsible for the task assignment that contains the portion of the media source asset that exhibits the problem. The method 500 then terminates.

In sum, a crowd worker routing system classifies each crowd worker on the basis of the skill and efficiency at which the crowd worker completes various tasks. The crowd worker routing system may assign different scores to a crowd worker for different categories of tasks and subtasks. The crowd worker routing system may also track the number of times a crowd source worker has completed various categories of tasks and subtasks. A subset of the tasks completed by a crowd worker is verified by one or more verifiers, where the verifiers may be trusted crowd workers or other trusted employees. The score for a given crowd worker increases when the verifier agrees with the crowd worker's results and decreases when the verifier disagrees with the crowd worker's results. The crowd worker routing system assigns a category to each crowd worker for each task type and subtask type performed by the crowd worker based on whether the score for a given crowd worker is low, average, or high. The crowd worker routing system selects new tasks for completion and routes the new tasks to a given crowd worker based on the category assigned to the crowd worker for the type of task or subtask.

One advantage of the disclosed techniques is that tasks are assigned dynamically to a group of crowd workers based on which crowd workers are available and have greater skill and efficiency to complete the available tasks. Crowd workers scores are automatically computed as a byproduct of completing tasks assignments and verifications, without the need for more manual performance assessment of crowd workers. As a result, task assignment routing dynamically conforms to changes changes in the skill and efficiency of each crowd worker over time, as well as changes to members of the group of crowd workers.

Another advantage of the disclosed techniques is that tasks assigned via crowdsourcing are completed more efficiently and with higher quality relative to previous crowdsourcing approaches. Crowd workers with greater skill and efficiency are incented by getting a greater quantity and more important prestigious tasks to perform, encouraging such crowd workers to continue to be a member of the group of crowd workers. Crowd workers with lesser skill and efficiency are disincented by being assigned no tasks or only to a small quantity of less important or prestigious tasks, increasing the likelihood that such crowd workers voluntarily remove themselves from the group of crowd workers. As a result, the productivity and quality of work performed by the group of crowd workers is likely to increase over time.

While the foregoing is directed to embodiments of the present invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention.

In view of the foregoing, the scope of the present invention is determined by the claims that follow.

What is claimed is:

1. A computer-implemented method comprising:
receiving a first media source asset comprising a video asset;
encoding the first media source asset to generate a first encoded media asset;
in response to generating the first encoded media asset, generating a first task assignment associated with a first quality control check on a streaming playback of the first encoded media source asset;
assigning the first task assignment to a first worker, comprising:
retrieving a plurality of scores associated with the first worker from a database, wherein each score included in the plurality of scores corresponds to at least one performance of the first worker with respect to completing a different type of task assignment, wherein each type of task assignment is associated with performing a different type of quality control check on at least a portion of a streaming playback of a media asset;
determining, via a processor, that the first task assignment is related to a first type of task assignment that corresponds to a first score included in the plurality of scores; and
determining, via the processor, that the first score and a quantity of previous task assignments of the first type of task assignment completed by the first worker satisfy a plurality of criteria for routing the first task assignment to the first worker;
causing the first task assignment to be routed, via the network, to the first worker for completion based on the first score, the quantity of previous task assignments of the first type of task assignment completed by the first worker, and one or more routing rules; and
upon detection that the first task assignment has been completed, causing the first encoded media source asset to be available for streaming playback;
wherein the plurality of criteria for routing comprise:
the first score being less than or equal to a first threshold and greater than a second threshold, and a first quantity of previous task assignments of the first type of task assignment completed by the first worker within a first specified period not exceeding a maximum value.

2. The method of claim 1, wherein the plurality of criteria for routing further comprise the first score being greater than a third threshold.

3. The method of claim 1, further comprising setting the first score to a fixed value if a total quantity of previous task assignments completed by the first worker is less than a minimum value.

4. The method of claim 1, wherein the first score is based on an individual score corresponding to only the first worker and a composite score corresponding to a subset of workers participating in the crowd-sourcing workforce, wherein the subset of workers includes the first worker.

5. The method of claim 1, further comprising:
retrieving a task result entered by the first worker corresponding to the first task assignment;
selecting the first task assignment for verification;
assigning the first task assignment to a second worker participating in the crowd-sourcing workforce to have the second worker repeat the first quality control check of the first task assignment to verify whether the second worker obtains a same quality control result as the first worker; and
upon detection that the first task assignment has been verified, causing the first encoded media source asset to be available for streaming playback.

6. The method of claim 5, wherein selecting the first task assignment for verification comprises determining that a total quantity of previous task assignments completed by the first worker is less than a minimum value.

7. The method of claim 5, wherein selecting the first task assignment for verification comprises determining that the task result indicates that the first media source asset failed the first quality control check.

8. The method of claim 1, further comprising:
in response to encoding the first media source asset, generating a first set of task assignments, wherein:
each task assignment in the first set of task assignments is associated with one of a first set of quality control checks of at least a portion of a streaming playback of the first encoded media source asset,
the first score is related to a media asset type, and
the media asset type identifies the portion of the first encoded media source asset as one of a video asset, an audio asset, or a text asset.

9. The method of claim 8, wherein the media source asset type comprises a text asset, the first task assignment is included in the first set of task assignments, and each task assignment in the first set of task assignments is associated with performing a quality control check on closed caption text or subtitle text.

10. The method of claim 8, wherein the media source asset type comprises an audio or a text asset, the first task assignment is included in the first set of task assignments, and each task assignment in the first set of task assignments is associated with performing a quality control check on the first media source asset in a specified language.

11. One or more non-transitory computer-readable storage media including instructions that, when executed by a processing unit, cause the processing unit to perform an operation, the operation comprising:
receiving a first media source asset comprising a video asset;
encoding the first media asset to generate a first encoded media asset;
in response to generating the first encoded media asset, generating a first task assignment associated with a first quality control check on a streaming playback of the first encoded media source asset;
assigning the first task assignment to a first worker, comprising:
retrieving a plurality of scores associated with the first worker from a database, wherein each score included in the plurality of scores corresponds to at least one performance of the first worker with respect to completing a different type of task assignment, wherein each type of task assignment is associated with performing a different type of quality control check on at least a portion of a streaming playback of a media asset;
determining that the first task assignment is related to a first type of task assignment that corresponds to a first score included in the plurality of scores; and
determining whether the first score and a quantity of previous task assignments of the first type of task assignment completed by the first worker satisfy a plurality of criteria for routing the first task assignment to the first worker;
causing the first task assignment to be routed, via the network, to the first worker for completion based on the first score, the quantity of previous task assignments of the first type of task assignment completed by the first worker, and one or more routing rules; and
upon detection that the first task assignment has been completed, causing the first encoded media source asset to be available for streaming playback;
wherein the plurality of criteria for routing comprise:
the first score being less than or equal to a first threshold and greater than a second threshold, and
a first quantity of previous task assignments of the first type of task assignment completed by the first worker within a first specified period not exceeding a maximum value.

12. The non-transitory computer-readable storage media of claim 11, wherein the plurality of criteria for routing further comprise the first score being greater than a third threshold.

13. The non-transitory computer-readable storage media of claim 11, wherein the operation further comprises setting the first score to a fixed value if a total quantity of previous task assignments completed by the first worker is less than a minimum value.

14. The non-transitory computer-readable storage media of claim 11, wherein the first score is based on an individual score corresponding to only the first worker and a composite score corresponding to a subset of workers participating in the crowd-sourcing workforce, wherein the subset of workers includes the first worker.

15. The non-transitory computer-readable storage media of claim 11, wherein the operation further comprises:
retrieving a task result entered by the first worker corresponding to the first task assignment;
selecting the first task assignment for verification;
assigning the first task assignment to a second worker participating in the crowd-sourcing workforce to have the second worker repeat the first quality control check of the first task assignment to verify whether the second worker obtains a same quality control result as the first worker; and upon detection that the first task assignment has been verified, causing the first encoded media source asset to be available for streaming playback.

16. A system, comprising:
a processor;
a first database comprising a plurality of records associated with a first set of task assignments; and
a memory containing instructions, which, when executed by the processor, cause the processor to:
receive a first media source asset comprising a video asset;
encode the first media source asset to generate a first encoded media asset;
in response to generating the first encoded media asset, generate a first task assignment associated with a first quality control check on a streaming playback of the first encoded media source asset;
assign the first task assignment to a first worker, comprising:
retrieve, from the first database, a plurality of scores associated with the first worker, wherein each score included in the plurality of scores corresponds to at least one performance of the first worker with respect to completing a different type of task assignment, wherein each type of task assignment is associated with performing a different type of quality control check on at least a portion of a streaming playback of a media asset;
determine that the first task assignment is related to a first type of task assignment that corresponds to a first score included in the plurality of scores; and
determine that the first score and a quantity of previous task assignments of the first type of task assignment completed by the first worker satisfy a plurality of criteria for routing the first task assignment to the first worker;
cause the first task assignment to be routed, via the network, to the first worker for completion based on the first score, the quantity of previous task assignments of the first type of task assignment completed by the first worker, and one or more routing rules; and
upon detection that the first task assignment has been completed, cause the first encoded media source asset to be available for streaming playback;
wherein the plurality of criteria for routing comprise:

the first score being less than or equal to a first threshold and greater than a second threshold, and
a first quantity of previous task assignments of the first type of task assignment completed by the first worker within a first specified period not exceeding a maximum value.

17. The method of claim 1, further comprising:
generating a first set of task assignments that includes the first task assignment and a second task assignment;
determining that the second task assignment is related to a second type of task assignment that corresponds to a second score included in the plurality of scores; and
assigning the second task assignment to the first worker for completion based on the second score and the one or more routing rules.

18. The method of claim 1, further comprising:
computing, via the processor, a composite score for a group of workers that includes the first worker;
assigning, via a processor, the first worker to a first category based on the first score and the composite score; and
determining, via the processor, a quota of task assignments based on the first category, wherein the first task assignment is assigned to the first worker if the quota has not been reached.

19. The computer-implemented method of claim 1, further comprising causing, at a display of a client device associated with the first worker, a first interface to be displayed, wherein the first interface includes at least a portion of the first task assignment.

20. The computer-implemented method of claim 5, further comprising:
increasing the first score of the first worker when the first worker and the second worker obtain the same task result; and
decreasing the first score of the first worker when the first worker and the second worker do not obtain the same task result.

21. The non-transitory computer-readable storage media of claim 13, wherein the operation further comprises:
increasing the first score of the first worker when the first worker and the second worker obtain the same task result; and
decreasing the first score of the first worker when the first worker and the second worker do not obtain the same task result.

* * * * *

UNITED STATES PATENT AND TRADEMARK OFFICE
CERTIFICATE OF CORRECTION

PATENT NO. : 10,671,947 B2  
APPLICATION NO. : 14/200330  
DATED : June 2, 2020  
INVENTOR(S) : Venu Gopal Nayar et al.

Page 1 of 1

It is certified that error appears in the above-identified patent and that said Letters Patent is hereby corrected as shown below:

On the Title Page

Item (72) Inventors:  
Please delete "Venu Gopal Nayar, San Anselmo, CA (US)" and insert --Venu Gopal Nayar, San Jose, CA (US)--;  
Please delete "Ryan Schroeder, San Anselmo, CA (US)" and insert --Ryan Schroeder, San Jose, CA (US)--.

Signed and Sealed this  
Sixth Day of July, 2021

Drew Hirshfeld  
*Performing the Functions and Duties of the*  
*Under Secretary of Commerce for Intellectual Property and*  
*Director of the United States Patent and Trademark Office*